UNITED STATES PATENT OFFICE.

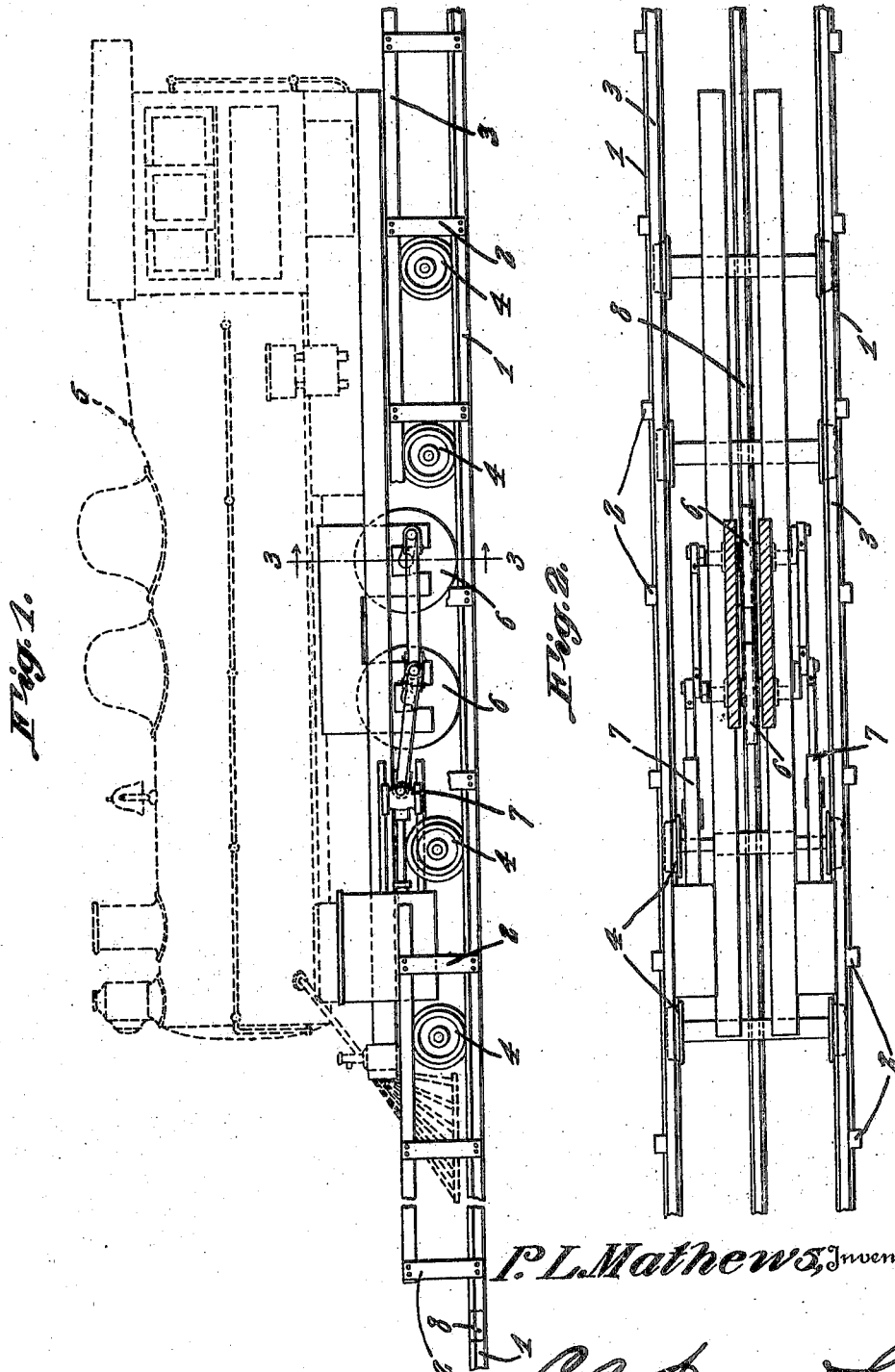

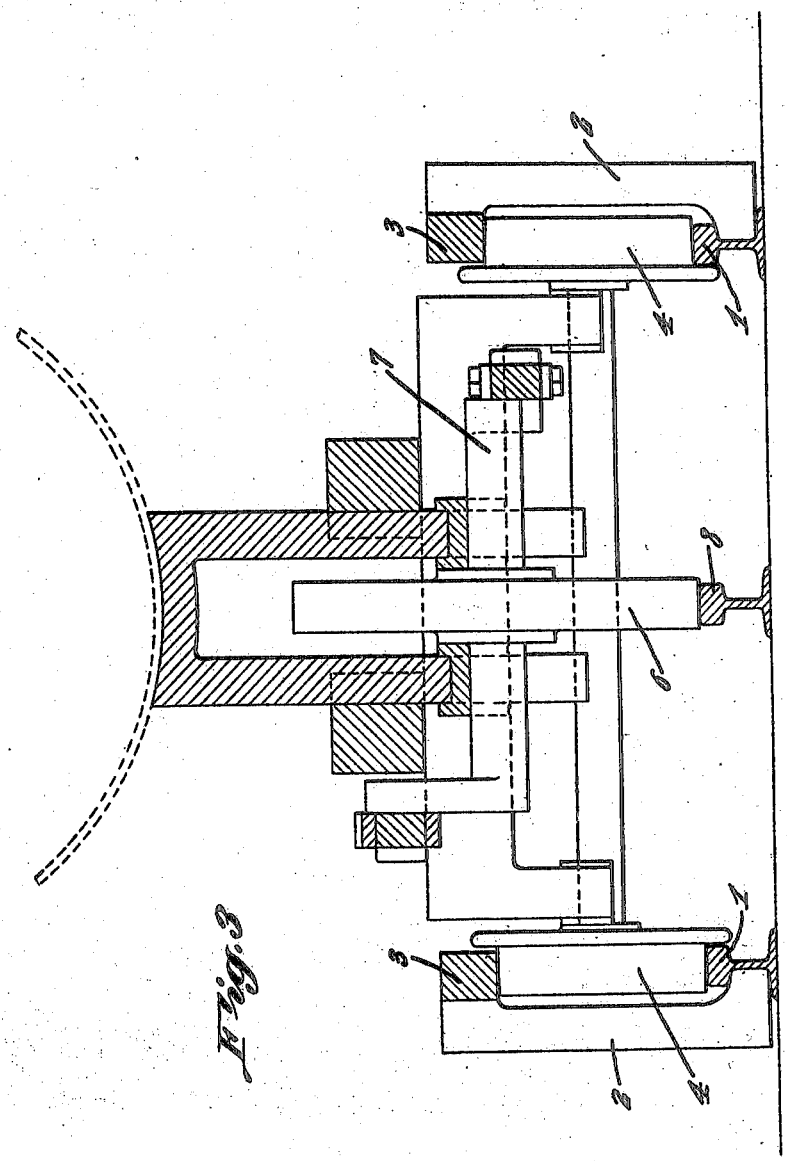

PEYTON L. MATHEWS, OF BATON ROUGE, LOUISIANA.

RAILWAY.

1,417,088. Specification of Letters Patent. Patented May 23, 1922.

Application filed February 24, 1921. Serial No. 447,530.

*To all whom it may concern:*

Be it known that I, PEYTON L. MATHEWS, a citizen of the United States, residing at Baton Rouge, in the parish of East Baton Rouge and State of Louisiana, have invented a new and useful Railway, of which the following is a specification.

This invention relates to railways, one of its objects being to provide a track which will hold the rolling stock positively in proper position so that the same cannot leave the track when traveling at any speed.

A further object is to provide a motor for use in connection with the track and which is designed to engage a third rail for the purpose of propelling the rolling stock, thus eliminating any interference that might occur between the special track structure and the driving mechanism ordinarily found upon locomotives and other motor cars.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of the structure constituting the present invention, a portion of the locomotive being indicated by dotted lines and part of the track being broken away.

Figure 2 is a horizontal section showing a portion of the drive mechanism of the locomotive and showing the track in plan.

Figure 3 is an enlarged section on line 3—3 Figure 1.

Referring to the figures by characters of reference 1 designates the ordinary railroad track and along the sides of this track at desired intervals are erected standards 2 which support guard rails 3. These rails 3 are directly over the rails 1 and are spaced therefrom a distance slightly greater than the diameter of the car wheels 4 which are mounted on the rails 1. These guard rails extend throughout the length of the track except at crossings where they are eliminated so as to allow vehicles and pedestrians to cross the track readily.

The motor vehicle adapted to travel on the track can be of any desired type such as a steam locomotive, an electric locomotive, a gasoline propelled vehicle, or the like.

In every instance, however, the vehicles, one of which has been indicated at 5, are provided with one or more central driving wheels 6 which, in the present instance, are propelled by steam operated mechanism indicated generally at 7. These wheels 6 are arranged above the center of the track and bear upon a third rail 8 which is between the rails 1 and in the same plane therewith. The motor vehicle 5 is provided with supporting wheels 4 of such diameter as to travel readily on the rails 1 and below the rails 3 so that they will thus be held to the track no matter at what speed the vehicle may be traveling.

What is claimed is:

The combination with track rails and a third rail therebetween, of guard rails above and parallel with the track rails, a motor vehicle having wheels mounted on the track rails and extending under and retained by the guard rails, said wheels supporting a portion of the weight of the vehicle, and being flanged, and a flangeless power driven propelling wheel bearing on the third rail and supporting a portion of the weight of the vehicle.

In testimony that I claim the foregoing as my own, I have hereto affixed my signature in the presence of two witnesses.

PEYTON L. MATHEWS.

Witnesses:
 FRANK CRUEL,
 C. E. JONES.